US012567274B2

(12) United States Patent
Kukla

(10) Patent No.: US 12,567,274 B2
(45) Date of Patent: Mar. 3, 2026

(54) GEOGRAPHIC MANAGEMENT OF DOCUMENT CONTENT

(71) Applicant: RedShred LLC, Baltimore, MD (US)

(72) Inventor: James Kukla, Ellicott City, MD (US)

(73) Assignee: RedShred LLC, Baltimore, MD (US)

( * ) Notice: Subject to any disclaimer, the term of this patent is extended or adjusted under 35 U.S.C. 154(b) by 0 days.

(21) Appl. No.: 18/071,284

(22) Filed: Nov. 29, 2022

(65) Prior Publication Data

US 2023/0215207 A1 Jul. 6, 2023

Related U.S. Application Data

(60) Provisional application No. 63/264,630, filed on Nov. 29, 2021.

(51) Int. Cl.
| | |
|---|---|
| *G06V 30/414* | (2022.01) |
| *G06F 16/903* | (2019.01) |
| *G06F 16/93* | (2019.01) |
| *G06F 40/30* | (2020.01) |
| *G06V 20/20* | (2022.01) |
| *G06V 30/14* | (2022.01) |
| *G06V 30/148* | (2022.01) |
| *G06V 30/262* | (2022.01) |

(52) U.S. Cl.
CPC ...... *G06V 30/414* (2022.01); *G06F 16/90335* (2019.01); *G06F 16/93* (2019.01); *G06F 40/30* (2020.01); *G06V 20/20* (2022.01); *G06V 30/1448* (2022.01); *G06V 30/148* (2022.01); *G06V 30/274* (2022.01); *G06V 2201/10* (2022.01)

(58) Field of Classification Search
CPC .............. G06V 30/274; G06V 30/148; G06V 30/1448; G06V 20/20; G06V 30/10; G06V 2201/10; G06V 30/414; G06F 40/30; G06F 16/93; G06F 16/90335; G06F 40/216; G06F 40/295; G06F 16/908
See application file for complete search history.

(56) References Cited

U.S. PATENT DOCUMENTS

| | | | |
|---|---|---|---|
| 5,701,500 A | 12/1997 | Ikeo | |
| 6,356,909 B1 | 3/2002 | Spencer | |
| 6,598,015 B1 | 7/2003 | Peterson | |
| 9,348,920 B1* | 5/2016 | Kesin | G06F 16/282 |
| 9,372,840 B1 | 6/2016 | Golchha | |
| 10,075,482 B2 | 9/2018 | Chinnapatlolla | |
| 2004/0243633 A1 | 12/2004 | Thompson | |
| 2005/0041860 A1 | 2/2005 | Jager | |
| 2005/0050054 A1 | 3/2005 | Clark | |
| 2005/0165642 A1 | 7/2005 | Brouze | |
| 2005/0256844 A1 | 11/2005 | Cristol | |
| 2006/0235831 A1 | 10/2006 | Adinolfi | |

(Continued)

*Primary Examiner* — Huawen A Peng
(74) *Attorney, Agent, or Firm* — Butzel Long

(57) ABSTRACT

Methods and systems are provided to manage documents and extract information from documents by defining segments in each document, each of which is assigned a location in a coordinate system defined over a collection of documents. Metadata is attached to each segment to describe the contents, position, and semantic meaning of material within the segment. A segmenting-specific query language can be used to query the segments and respond to requests for information contained in the documents.

16 Claims, 11 Drawing Sheets

(56)  References Cited

U.S. PATENT DOCUMENTS

| | | | |
|---|---|---|---|
| 2006/0242159 | A1 | 10/2006 | Bishop |
| 2008/0046838 | A1 | 2/2008 | Haub |
| 2008/0235271 | A1 | 9/2008 | Wang |
| 2008/0243479 | A1 | 10/2008 | Cafarella |
| 2008/0270380 | A1 | 10/2008 | Ohrn |
| 2009/0119255 | A1* | 5/2009 | Frank .................... G06F 40/137 |
| 2010/0082177 | A1 | 4/2010 | Chang |
| 2010/0331041 | A1* | 12/2010 | Liao ...................... G06V 10/462 |
| | | | 455/556.1 |
| 2011/0052062 | A1* | 3/2011 | Chiu .................... G06V 30/413 |
| | | | 382/176 |
| 2011/0137898 | A1 | 6/2011 | Gordo |
| 2011/0258195 | A1 | 10/2011 | Welling |
| 2011/0258213 | A1 | 10/2011 | Pollara |
| 2012/0284199 | A1 | 11/2012 | Lundberg |
| 2013/0046782 | A1 | 2/2013 | Lee |
| 2017/0052944 | A1 | 2/2017 | Choudhry |
| 2017/0132203 | A1 | 5/2017 | Kim |
| 2018/0199075 | A1* | 7/2018 | Wang ...................... H04L 65/65 |
| 2018/0219827 | A1 | 8/2018 | Agathangelos |
| 2020/0012851 | A1 | 1/2020 | Stanley |
| 2020/0160050 | A1* | 5/2020 | Bhotika ............... G06V 30/414 |
| 2020/0175095 | A1* | 6/2020 | Morariu ................. G06N 3/045 |
| 2020/0193153 | A1* | 6/2020 | Lee ...................... G06V 30/413 |
| 2020/0364451 | A1* | 11/2020 | Ammar ................ G06V 10/768 |
| 2021/0158093 | A1 | 5/2021 | Kaynig-Fittkau |
| 2021/0192126 | A1* | 6/2021 | Gehrmann ............... G06N 3/09 |
| 2022/0171893 | A1* | 6/2022 | Ye ............................ G06F 30/13 |

\* cited by examiner

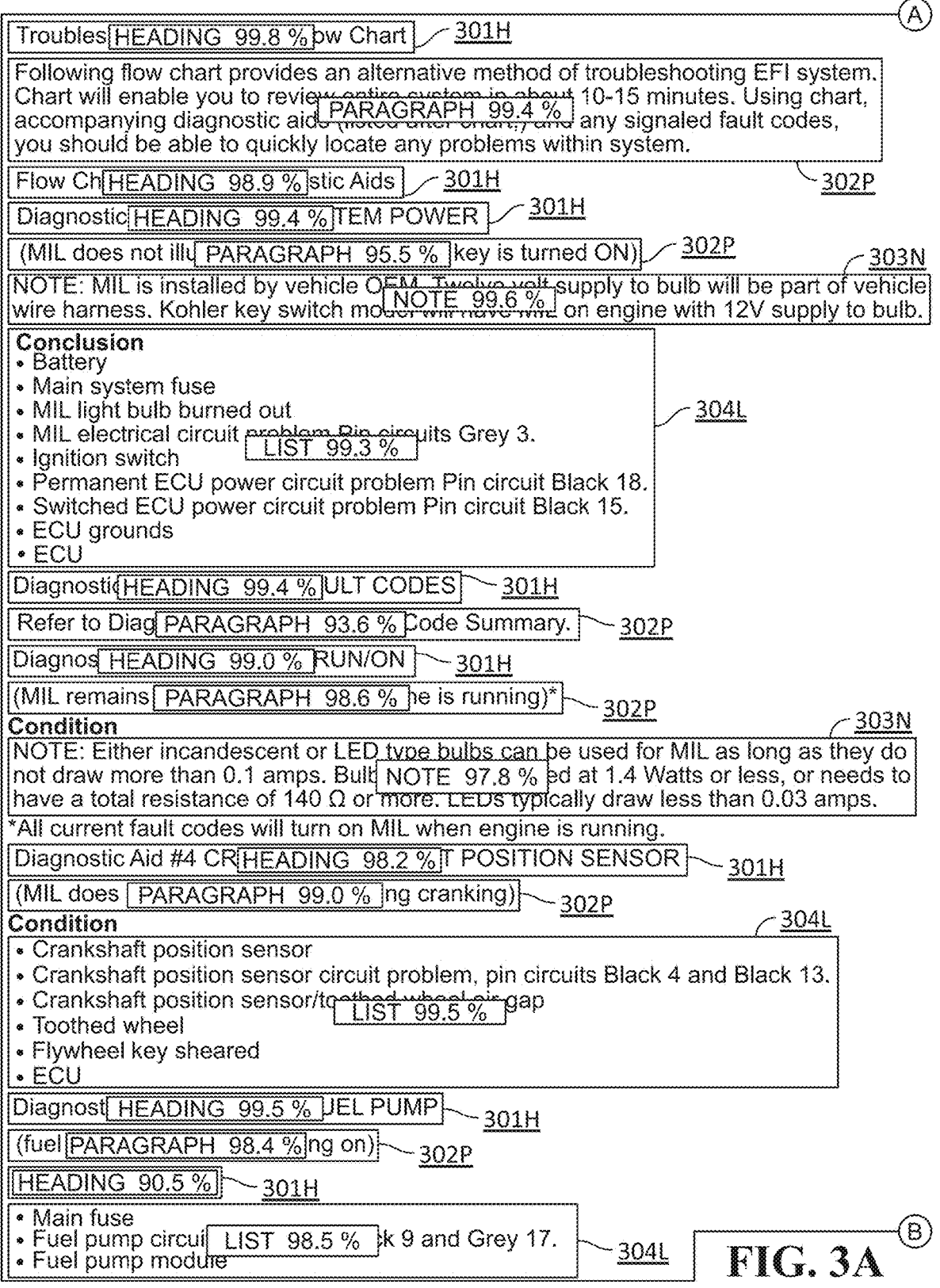

(A)

Troubles|HEADING  99.8 %|ow Chart   — 301H

Following flow chart provides an alternative method of troubleshooting EFI system. Chart will enable you to review entire system in about 10-15 minutes. Using chart, accompanying diagnostic aids |PARAGRAPH  99.4 %| and any signaled fault codes, you should be able to quickly locate any problems within system.   — 302P Flow Ch|HEADING  98.9 %|stic Aids   — 301H Diagnostic|HEADING  99.4 %|TEM POWER   — 301H (MIL does not illu| PARAGRAPH  95.5 % |key is turned ON)   — 302P   — 303N NOTE: MIL is installed by vehicle OEM. Twelve-volt supply to bulb will be part of vehicle wire harness. Kohler key switch module will have wire |NOTE  99.6 %| on engine with 12V supply to bulb.

Conclusion
• Battery
• Main system fuse
• MIL light bulb burned out
• MIL electrical circuit problem Pin circuits Grey 3.   — 304L
  |LIST  99.3 %|
• Ignition switch
• Permanent ECU power circuit problem Pin circuit Black 18.
• Switched ECU power circuit problem Pin circuit Black 15.
• ECU grounds
• ECU Diagnosti|HEADING  99.4 %|ULT CODES   — 301H Refer to Diag| PARAGRAPH  93.6 % |Code Summary.   — 302P Diagnos|HEADING  99.0 %|RUN/ON   — 301H (MIL remains| PARAGRAPH  98.6 % |he is running)*   — 302P   — 303N

Condition
NOTE: Either incandescent or LED type bulbs can be used for MIL as long as they do not draw more than 0.1 amps. Bulb |NOTE  97.8 %| ed at 1.4 Watts or less, or needs to have a total resistance of 140 Ω or more. LEDs typically draw less than 0.03 amps.

*All current fault codes will turn on MIL when engine is running.

Diagnostic Aid #4 CR|HEADING  98.2 %|T POSITION SENSOR   — 301H (MIL does | PARAGRAPH  99.0 % |ng cranking)   — 302P

Condition   — 304L
• Crankshaft position sensor
• Crankshaft position sensor circuit problem, pin circuits Black 4 and Black 13.
• Crankshaft position sensor/toothed wheel air gap
  |LIST  99.5 %|
• Toothed wheel
• Flywheel key sheared
• ECU Diagnost|HEADING  99.5 %|UEL PUMP   — 301H (fuel|PARAGRAPH  98.4 %|ng on)   — 302P

|HEADING  90.5 %|   — 301H

• Main fuse
• Fuel pump circui| LIST  98.5 % |k 9 and Grey 17.   — 304L
• Fuel pump module (B)

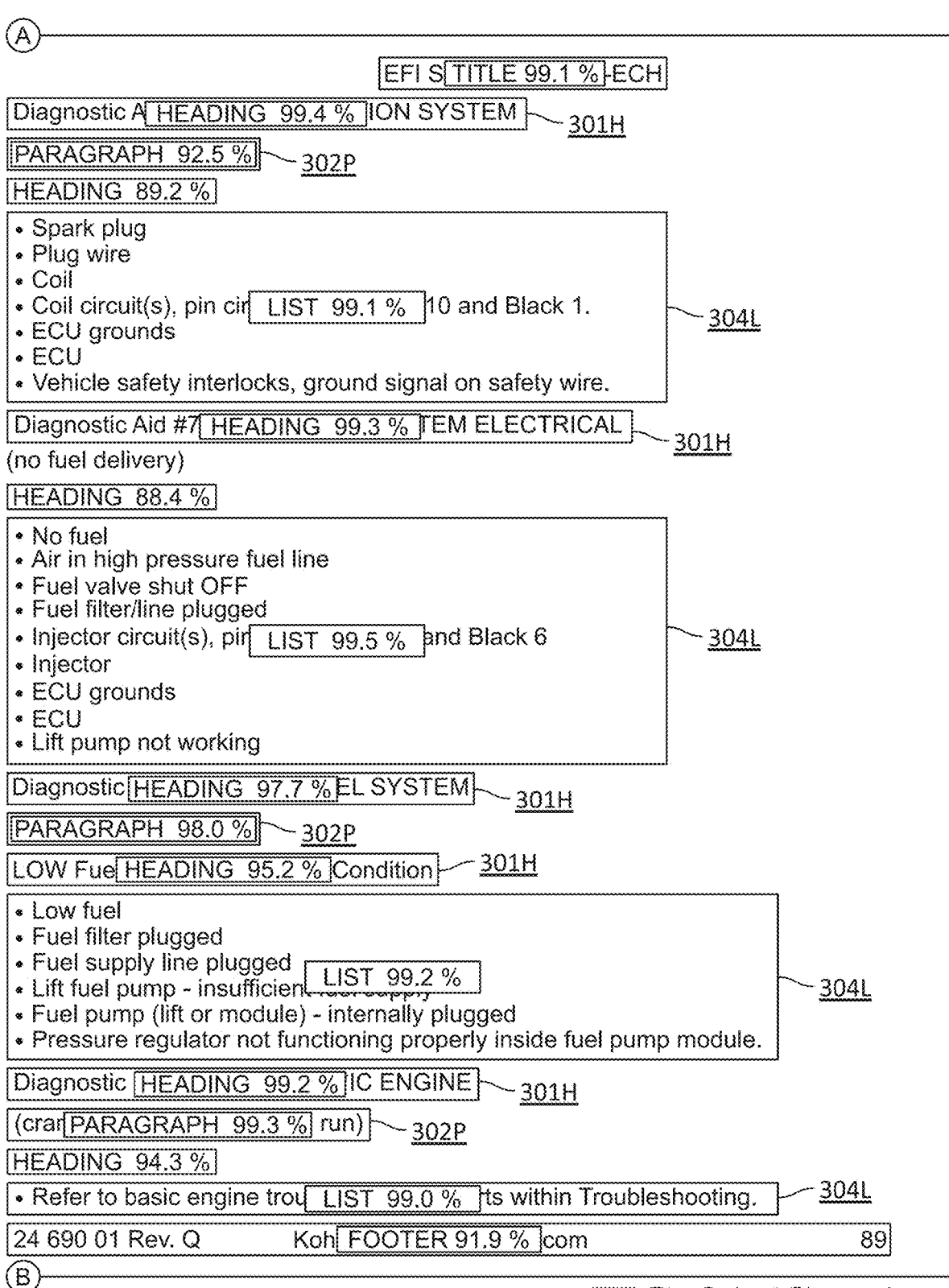

EFI S TITLE 99.1 % ECH

Diagnostic A HEADING 99.4 % ION SYSTEM — 301H

PARAGRAPH 92.5 % — 302P

HEADING 89.2 %

- Spark plug
- Plug wire
- Coil
- Coil circuit(s), pin cir LIST 99.1 % 10 and Black 1.
- ECU grounds
- ECU
- Vehicle safety interlocks, ground signal on safety wire.

— 304L

Diagnostic Aid #7 HEADING 99.3 % TEM ELECTRICAL — 301H (no fuel delivery)

HEADING 88.4 %

- No fuel
- Air in high pressure fuel line
- Fuel valve shut OFF
- Fuel filter/line plugged
- Injector circuit(s), pin LIST 99.5 % and Black 6
- Injector
- ECU grounds
- ECU
- Lift pump not working

— 304L

Diagnostic HEADING 97.7 % EL SYSTEM — 301H

PARAGRAPH 98.0 % — 302P

LOW Fue HEADING 95.2 % Condition — 301H

- Low fuel
- Fuel filter plugged
- Fuel supply line plugged
- Lift fuel pump - insufficien LIST 99.2 %
- Fuel pump (lift or module) - internally plugged
- Pressure regulator not functioning properly inside fuel pump module.

— 304L

Diagnostic HEADING 99.2 % IC ENGINE — 301H (cra PARAGRAPH 99.3 % run) — 302P

HEADING 94.3 %

- Refer to basic engine trou LIST 99.0 % ts within Troubleshooting. — 304L 24 690 01 Rev. Q    Koh FOOTER 91.9 % com    89

Figure 3B:
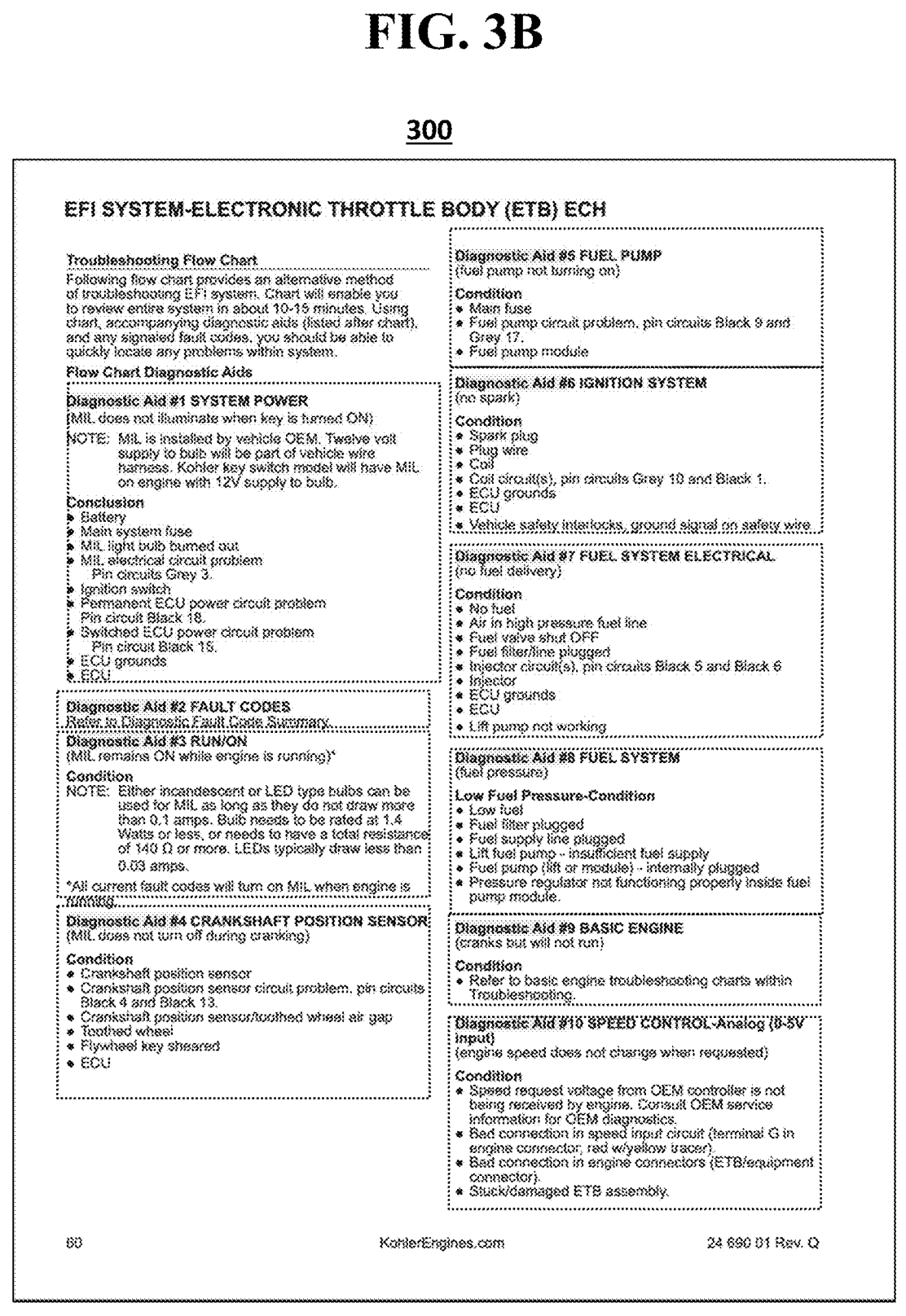

EFI SYSTEM-ELECTRONIC THROTTLE BODY (ETB) ECH

Troubleshooting Flow Chart

Following flow chart provides an alternative method of troubleshooting EFI system. Chart will enable you to review entire system in about 10-15 minutes. Using chart, accompanying diagnostic aids (listed after chart), and any signaled fault codes, you should be able to quickly locate any problems within system.

Flow Chart Diagnostic Aids

Diagnostic Aid #1 SYSTEM POWER
(MIL does not illuminate when key is turned ON)

NOTE: MIL is installed by vehicle OEM. Twelve volt supply to bulb will be part of vehicle wire harness. Kohler key switch model will have MIL on engine with 12V supply to bulb.

Conclusion
- Battery
- Main system fuse
- MIL light bulb burned out
- MIL electrical circuit problem
  Pin circuits Grey 3.
- Ignition switch
- Permanent ECU power circuit problem
  Pin circuit Black 18.
- Switched ECU power circuit problem
  Pin circuit Black 15.
- ECU grounds
- ECU

Diagnostic Aid #2 FAULT CODES
Refer to Diagnostic Fault Code Summary.

Diagnostic Aid #3 RUN/ON
(MIL remains ON while engine is running)*

Condition
NOTE: Either incandescent or LED type bulbs can be used for MIL as long as they do not draw more than 0.1 amps. Bulb needs to be rated at 1.4 Watts or less, or needs to have a total resistance of 140 Ω or more. LEDs typically draw less than 0.03 amps.

*All current fault codes will turn on MIL when engine is running.

Diagnostic Aid #4 CRANKSHAFT POSITION SENSOR
(MIL does not turn off during cranking)

Condition
- Crankshaft position sensor
- Crankshaft position sensor circuit problem, pin circuits Black 4 and Black 13.
- Crankshaft position sensor/toothed wheel air gap
- Toothed wheel
- Flywheel key sheared
- ECU

Diagnostic Aid #5 FUEL PUMP
(fuel pump not turning on)

Condition
- Main fuse
- Fuel pump circuit problem, pin circuits Black 9 and Grey 17.
- Fuel pump module

Diagnostic Aid #6 IGNITION SYSTEM
(no spark)

Condition
- Spark plug
- Plug wire
- Coil
- Coil circuit(s), pin circuits Grey 10 and Black 1.
- ECU grounds
- ECU
- Vehicle safety interlocks, ground signal on safety wire

Diagnostic Aid #7 FUEL SYSTEM ELECTRICAL
(no fuel delivery)

Condition
- No fuel
- Air in high pressure fuel line
- Fuel valve shut OFF
- Fuel filter/line plugged
- Injector circuit(s), pin circuits Black 5 and Black 6
- Injector
- ECU grounds
- ECU
- Lift pump not working

Diagnostic Aid #8 FUEL SYSTEM
(fuel pressure)

Low Fuel Pressure-Condition
- Low fuel
- Fuel filter plugged
- Fuel supply line plugged
- Lift fuel pump - insufficient fuel supply
- Fuel pump (lift or module) - internally plugged
- Pressure regulator not functioning properly inside fuel pump module.

Diagnostic Aid #9 BASIC ENGINE
(cranks but will not run)

Condition
- Refer to basic engine troubleshooting charts within Troubleshooting.

Diagnostic Aid #10 SPEED CONTROL-Analog (0-5V input)
(engine speed does not change when requested)

Condition
- Speed request voltage from OEM controller is not being received by engine. Consult OEM service information for OEM diagnostics.
- Bad connection in speed input circuit (terminal G in engine connector; red w/yellow tracer).
- Bad connection in engine connectors (ETB/equipment connector).
- Stuck/damaged ETB assembly.

FIG. 3C (Cont.)

24 690 01 Rev. Q

KohlerEngines.com

60

Ⓜ

Ⓛ

Ⓚ

Ⓠ

...cent or LED type bulbs can be
...long as they do not draw more
Bulb needs to be rated at 1.4
...r needs to have a total resistance
...re. LEDs typically draw less than
...0.05 amps.

\* All current fault codes will turn on MIL when engine is
running.

Diagnostic Aid #4 CRANKSHAFT POSITION SENSOR

(MIL does not turn off during cranking)

Condition

- Crankshaft position sensor
- Crankshaft position sensor circuit problem, pin circuits
  Black 4 and Black 13.
- Crankshaft position sensor/toothed wheel air gap
- Toothed wheel
- Flywheel key sheared
- ECU

Diagnostic Aid #8 FUEL SYSTEM

(fuel pressure)

Low Fuel pressure–Condition

- Low fuel
- Fuel filter plugged
- Fuel supply line plugged
- Lift fuel pump – insufficient fuel supply
- Fuel pump (lift or module) – internally plugged
- Pressure regulator not functioning properly inside fuel
  pump module.

Diagnostic Aid #9 BASIC ENGINE

(cranks but will not run)

Condition

- Refer to basic engine troubleshooting charts within
  Troubleshooting.

Diagnostic Aid #10 SPEED CONTROL–Analog

(0–5V input)

(engine speed does not change when requested)

Condition

- Speed request voltage from OEM controller is not
  being received by engine. Consult OEM service
  information for OEM diagnostics.
- Bad connection in speed input circuit (terminal G in
  engine connector, red w/yellow tracer).
- Bad connection in engine connectors (ETB/equipment
  connector).
- Stuck/damaged ETB assembly.

GEOGRAPHIC MANAGEMENT OF DOCUMENT CONTENT

CROSS-REFERENCE TO RELATED APPLICATIONS

This application claims the priority of U.S. Provisional Application Ser. No. 63/264,630, filed Nov. 29, 2021, the disclosure of which is incorporated by reference in its entirety.

BACKGROUND

The number, type, and structure of documents in many domains is continuously increasing. Reading, analyzing, and interpreting a wide variety of documents by humans can be a tedious task, especially in industries and other contexts that use lengthy documents providing a great deal of information.

Conventional techniques for processing certain types of documents, such as technical manuals, grant proposals, Request for Proposals (RFPs), and the like, typically include downloading individual files from multiple online sources and editing them with a variety of desktop computer applications such as Adobe Acrobat, Microsoft Word, and the like. In many cases, documents must be opened, searched, and processed before the contents of the document can be used, such as downloading and reading RFPs or bids and editing these documents to develop associated market reports. As another example, it may be desirable to make educational content accessible in augmented- or virtual-reality contexts, or to align various and disparate manual sources for engineering troubleshooting. In all of the scenarios, both manual visual search and keyword search are used to find areas of interest by using primitive keyword search techniques to find areas of interest by guessing at the wording that may be used inside each particular document. These activities may be repeated across many documents from many different sources, which generally will not be in a common format or structure.

In some cases, documents may be converted from the various formats in which they are received to a common format, such as by entering the text of each document into a relational database or similar. Such conversions often require human intervention or direct human transcription. Even where computer-aided "copy/paste" techniques are used, such approaches are prone to needless duplication, errors and omissions in data entry, and the like.

BRIEF DESCRIPTION OF THE DRAWINGS

FIG. 3A shows a document page having a plurality of segment types according to embodiments disclosed herein.

FIG. 3B shows a document generated from the document segments shown in FIG. 3A.

DETAILED DESCRIPTION

Figure 1A:
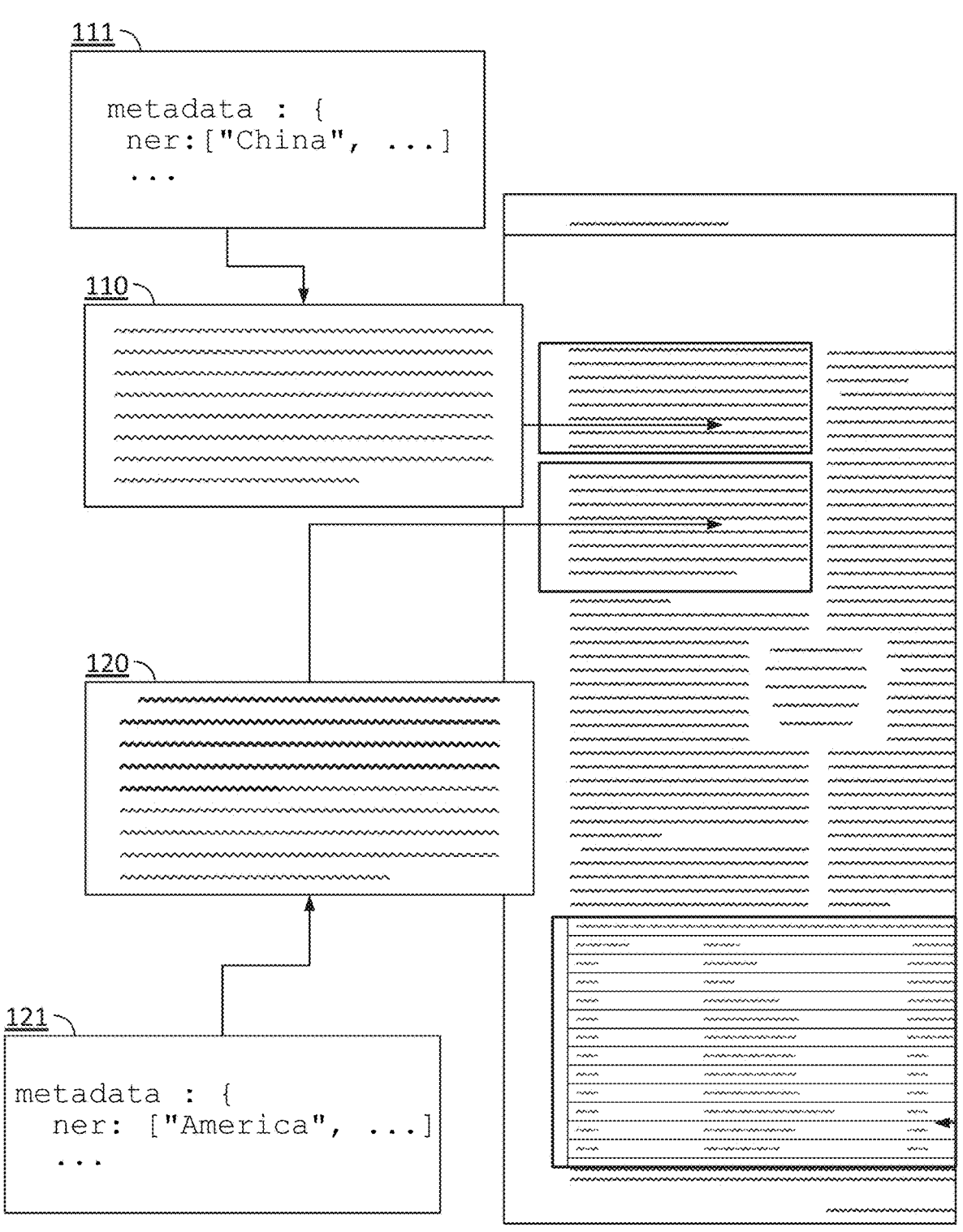
FIGS. 1A and 1B show segments defined in a page of a document in a collection of documents according to embodiments disclosed herein.

The present disclosure provides computerized systems and methods for managing document content from a geographical perspective, i.e., based on the physical geometry of the document, using a coordinate system that spans both a single document as well as a collection of documents. This brings together document management, computer vision, natural language processing, database systems, and geographic information systems in a novel way. The system described provides flexible, a la carte data access by leveraging physical co-location in the application's coordinate system.

As used herein:

A document is content, often originating from a page-oriented file format such as PDF, Word, et al. A single document may contain text, images, tables, and other features.

A collection is one or more documents grouped together.

A segment is a set of coordinates that are mapped to a region of one or more documents. Segments may be composed of disconnected parts (e.g. two independent polygons) and are often represented with something like a MultiPolygon, i.e., a union of multiple polygons. Each segment includes any text within the coordinates that define the segment, one or more regions of the coordinate space within a document collection that are occupied by the segment, and metadata generated by one or more enrichments. The metadata may be attached to the region of the collection coordinate system occupied by the segment.

An enrichment refers to a software plugin, algorithm, or comparable component that can identify and/or access a segment, process it, and identify metadata about that segment. For example, an enrichment may perform image classification or object detection on image segments to describe in structured terms what appears in the image. For paragraph-type segments, an enrichment may run named-entity recognition or sentiment analysis to provide additional metadata for text content.

A perspective is a set of one or more segments. Perspectives may be determined automatically, such as based on semantic, vector, or other computerized groupings of segments. Perspectives also may be defined by a user based on one or more criteria that may be automatically matched by a computerized document processing system as disclosed herein, for example based on metadata associated with the segments.

According to embodiments disclosed herein, documents pages may be mapped into a conceptual coordinate system where each document page occupies a unit square. Documents in a collection are organized across the notional x-axis. Each document is assigned an integer index. Integer indices may not be re-used once assigned to a document, and new documents in the collection will be assigned a new index or a temporary "holding" index location at the end of the list of documents. By not re-using document indices, embodiments disclosed herein may provide both a permanent space in a collection for that document but also prevent changes in the stored data from impacting segments that have been stored in external data management systems. If document indices were re-used, old segments would point to regions that may be occupied by a different document at the same coordinate address.

Document pages may be arranged from page 1 to page n along the notional y-axis such that the y-coordinate of page k+1 places it below page k. So, for example, the nth page of the mth document in a collection may be described by coordinate (m, n). The assignment of addresses in this space may be accomplished using fixed point arithmetic to avoid a loss of spatial resolution that can happen with floating point systems near the extreme ends of their supported ranges. By placing the documents in a collection-wide coordinate system, sections of any given document are disambiguated so that, for example, page 1 of document 5 and page 1 of document 6 are in physically different coordinates and may be easily manipulated using straightforward mathematical and/or matrix representations. Segments as disclosed herein can span multiple sections of multiple documents. For example, if we a language model has been tuned over all the body paragraphs of documents 0 thru 50, a new segment may be created to encompass all documents with the details about the language model (e.g. how it was generated, the URL to access it, and the like). When subsequent documents 51-100 are received and are to be added to the model, the new segment and associated metadata may indicate that the language model does not "cover" that region of the collection's coordinate system, i.e., it has not yet been extended to encompass the new documents. Links also may be created from one region to another region within the same coordinate system, thereby allowing references and hyperlinks between documents to be created.

Embodiments disclosed herein provide computer-implemented systems for receiving collections of documents, automatically identifying segments within the documents in the collection, and manipulating those segments. For example, after a document collection has been processed by the system, a user may query the entire collection to identify segments having a particular sentiment (e.g., positive, neutral, negative), to identify particular types of segments, or the like. As another example, segments may be manipulated to convert them to another format or to a common format, such as where flowcharts are analyzed and automatically converted into series of instructions, or the like. Segments may cross page boundaries (e.g. for paragraphs that continue from one page to the next) and can be separated by other segments (e.g. a footer or header across a page break).

As documents arrive in the system, they may be decomposed into pages by a first pass preprocessor. The system may use only page images for this initial analysis, for example as disclosed in further detail herein in relation to a "page image generator" enhancement technique, but also may use software libraries to access underlying data directly, such as PDF, Word, HTML, or the like. Document segments may be matched based on metadata (e.g. "all pages", "even-numbered pages", or the like). The metadata forms a data structure held in memory or a database that allows queries to be run against it as described in further detail herein.

As a document page is decomposed, new segments may be generated, for example by combining portions of a page into a single segment, combining multiple previously-identified segments into a single segment, splitting an existing segment into multiple new segments, or the like. As those segments are generated, they may be compared to any enrichments in the system to see which enrichments should be run on this segment. For example, each segment may be classified based on the content and position of the segment as disclosed herein and matching enrichments may be applied based on the segment classification. When an enrichment's configuration matches a segment by way of rules or classification, the enrichment is run and the enrichment generates a new segment with additional metadata.

The metadata for a page is the superset of any metadata stored on segments that fall within that page. Instead of explicitly linking this content together with foreign key relationships, pointers, and other mechanisms, the system relates content based on the geographic region covered by the segment. Therefore at query time users can "assemble" whatever segment and perspective data they need without a priori understanding of those relationships. The allows a la carte style data queries and access.

Figure 3C:
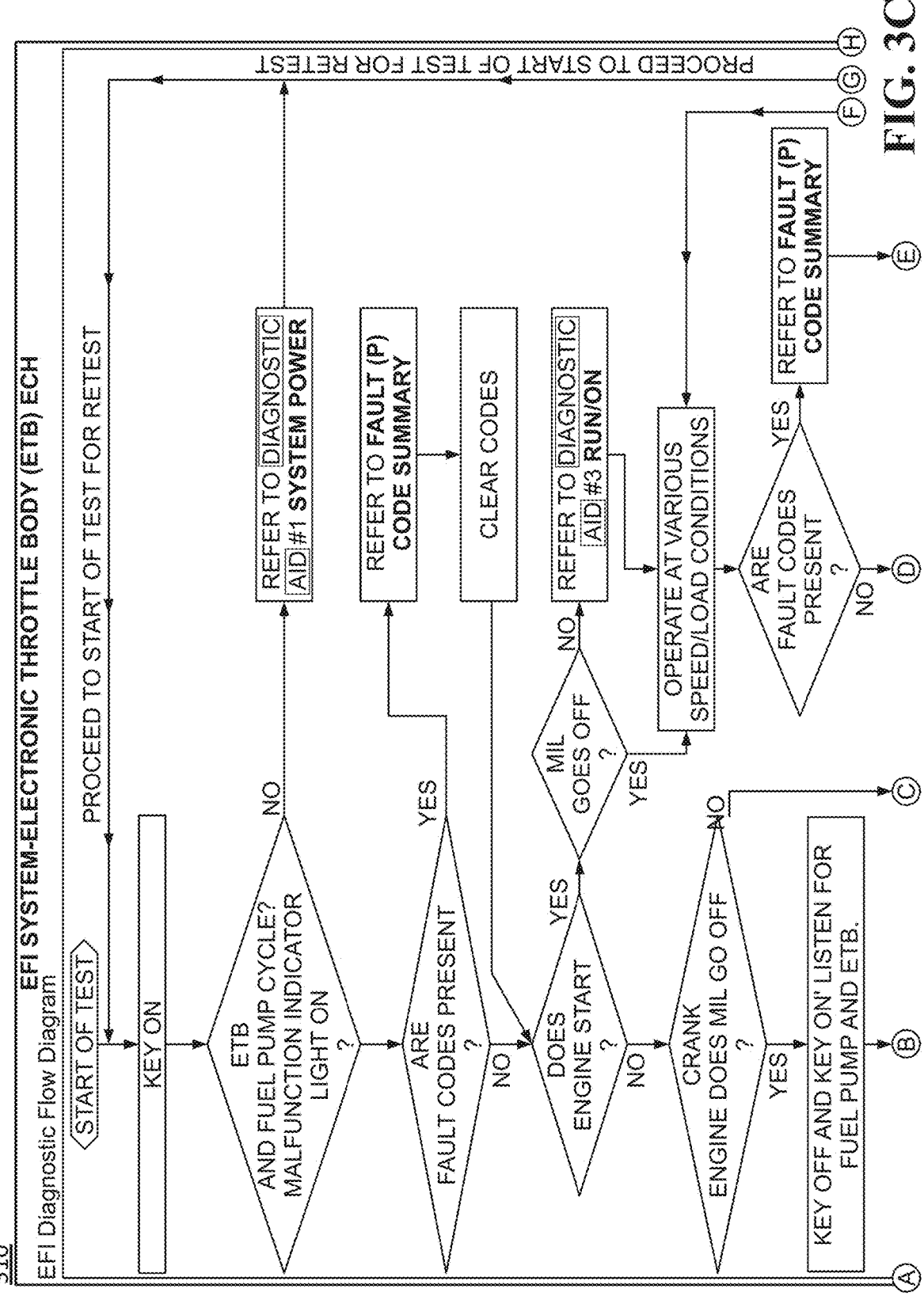
FIG. 3C shows additional segments from another document in the same document collection as the document shown in FIG. 3A and used to generate the document shown in FIG. 3B.
Figure 3C:
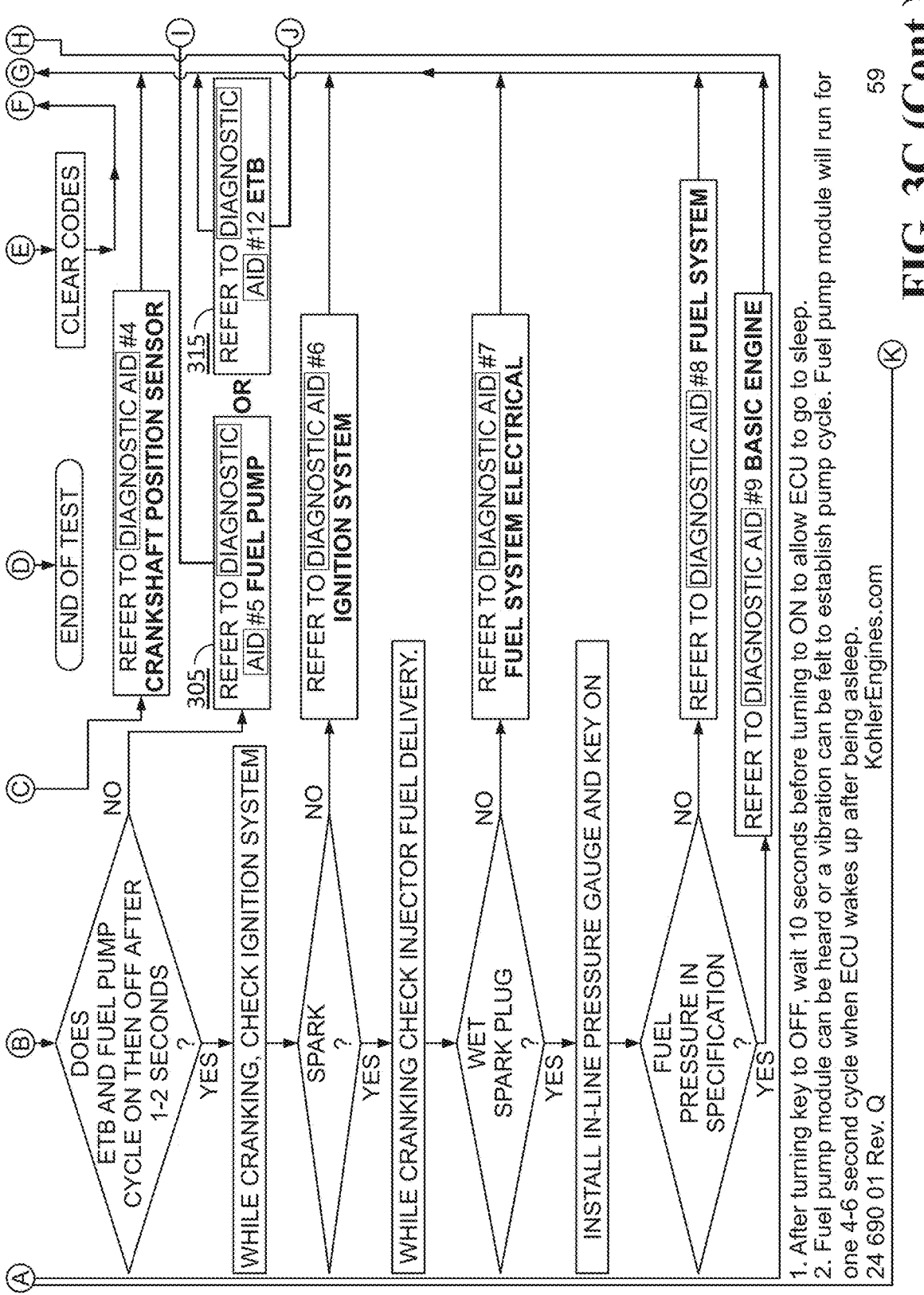
Figure 3C:
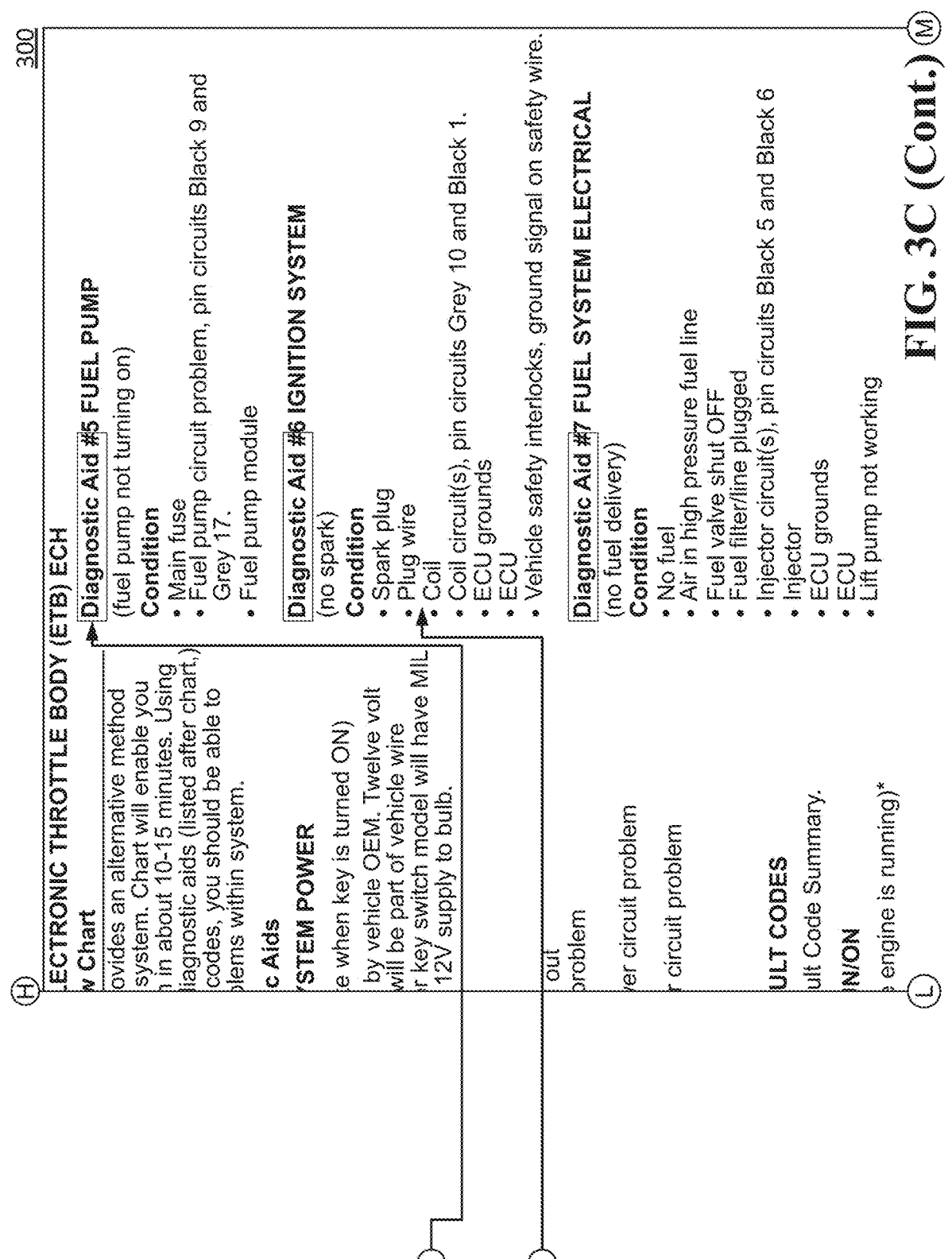
Figure 4:
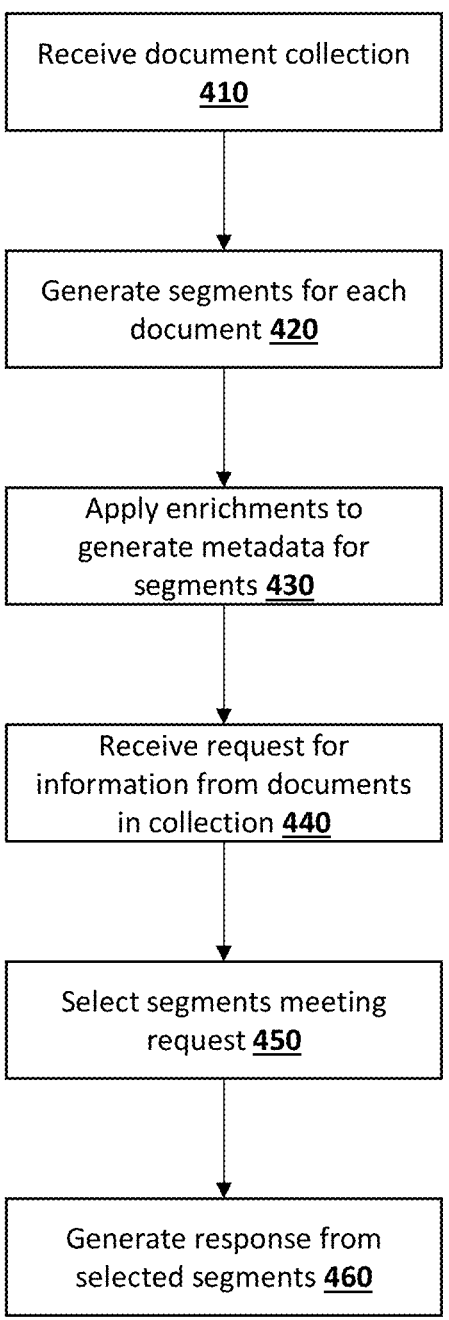
FIG. 4 shows a process for managing document content as disclosed herein.

FIG. 4 shows a basic process for managing one or more documents as disclosed herein. At 410, the documents are received, either from a user or an existing document store. The documents may be arranged in one or more collections as disclosed herein. At 420, each page of each document may be processed to identify segments within the document as disclosed herein. Examples of different segment types are shown and described in further detail with respect to FIGS. 1-3. As disclosed in further detail herein, each segment identified in a document may be processed by one or more enrichments to generate metadata for the segment at 430, which then is attached to the segment. For example, the metadata may be stored in a machine-readable data store with a logical link to the segment, the document page, the document, the document collection, and/or a location within a coordinate system defined for the document collection as disclosed herein.

At 440, the document management system may receive a request for information stored in the documents. In some cases the request may include an indication of specific data or a specific type of data that is desired, a specific perspective defined over the documents, specific metadata, or the like. Alternatively, the request may be a more general query for information that the user expects to be contained within the document collection. At 450, segments meeting the request may be identified, for example, based on the metadata attached to the segments at 430. A response is generated at 460 based on the metadata and associated segments. The response may provide the original data as presented in the documents, the segments identified at 420, the metadata generated at 430, or combinations thereof. Alternatively or in addition, the response also may include a synthesis of data from the documents, but in a form that was not present in the original documents. For example, a flowchart may be decomposed to individual steps or features; an instruction manual may be rearranged into individual, discrete jobs, or the like.

Figure 1B:
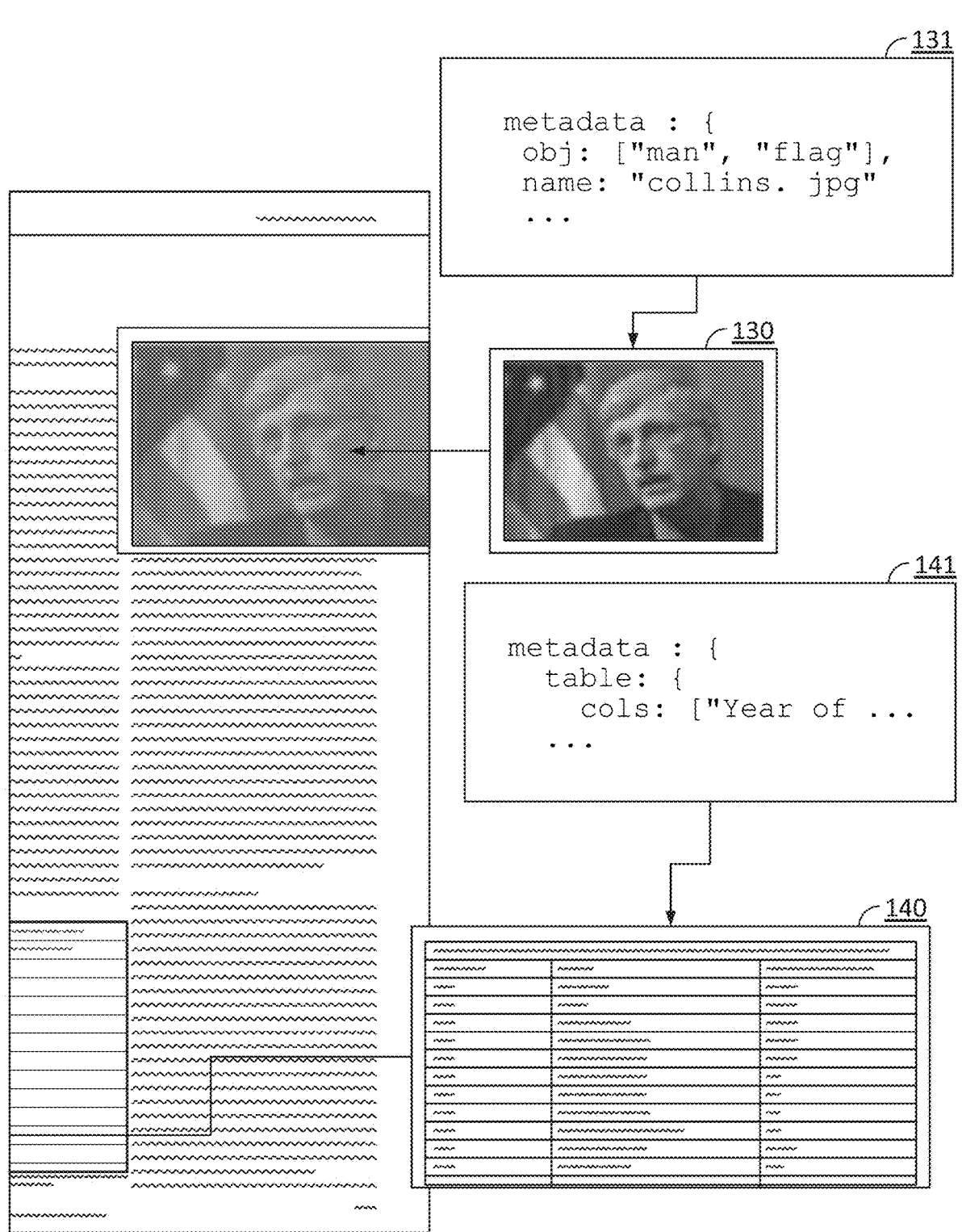

FIGS. 1A and 1B show an example of a document page that has multiple segments and multiple types of segments. In FIG. 1A, the left half of a page has been found to include two "paragraph" segments 110, 120. Metadata may be attached to the segments by the system, for example, based on the content of the text in the paragraphs. In this example, segment 110 has metadata 111 indicating that the text relates to "China" and segment 120 has metadata 121 indicating that the text relates to "America." For segments that include text, the metadata may be based on natural language processing (NLP) or other computerized analysis of the text. Metadata also may be assigned based on the placement of the segment (left column, top/bottom half), based on the segment's proximity to other segments such as images and tables (for example as shown in FIG. 1B), or the like. More generally, metadata may be generated by one or more enrichments as disclosed herein, which analyze each segment to identify a particular type of metadata.

FIG. 1B shows other segments identified on the page shown in FIG. 1A, including an image 130 and a table 140. Metadata 131 for the image may include a description of the contents of the image (e.g., "man," "flag," etc.), which may be generated by an enrichment that applies a machine vision algorithm or similar automated, computerized analysis of the image. Similarly, metadata 141 may describe the segment 140 which includes a data table. The metadata 141 may include a functional definition of the table, such as the number, headings, and/or data types of each column, the number of rows, any sub-groupings within the table, and the like.

Natural language processing (NLP) algorithms, computer vision algorithms, and the like may be applied to each segment to generate appropriate metadata. In some cases, segments may be pre-processed to determine the appropriate types of enrichment to be applied. For example, text-heavy segments may be enriched using NLP techniques, while images may be processed using only computer vision or, where images include some text as well, both computer vision and NLP enrichments may be applied.

Figure 2:
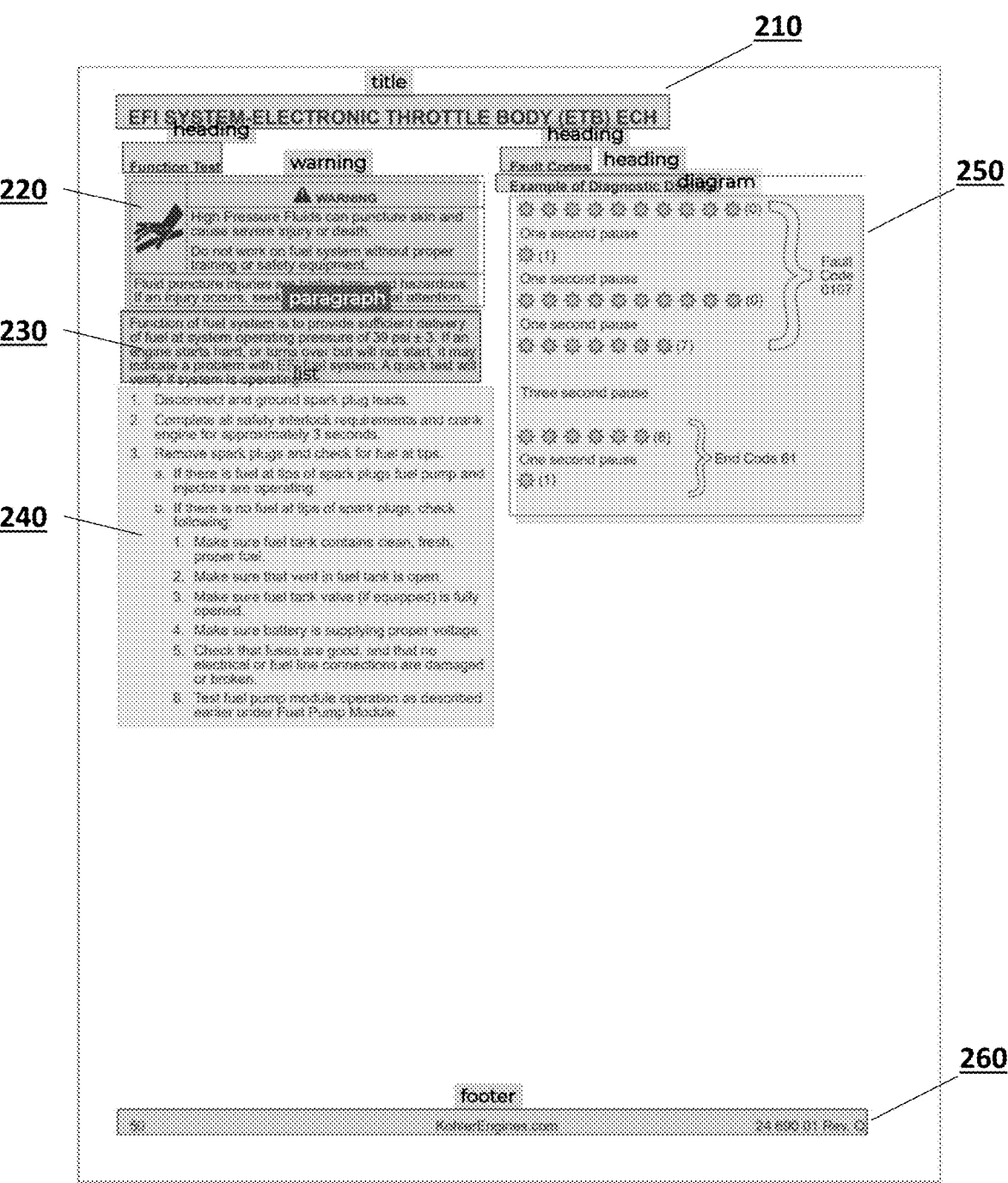
FIG. 2 shows a document page having a plurality of segment types according to embodiments disclosed herein.

Segments also may be identified based on the region or regions of the document page on which the segment occurs. FIG. 2 shows another example document in which several regions have been identified based on their position and content. A segment 210 may be identified as a title based on, for example, the font size and weight, the position at the top of the page, and/or an NLP analysis of the textual content of the segment. Similarly, segment 260 is identified as a "footer" segment based on its position at the bottom of the page and/or the content within the segment (page number, text repeated across multiple pages, etc.).

the segment. Metadata for the segment 220 may include, for example, a particular type of warning, an icon or other image which may indicate the presence of the warning generally or a particular type of warning (e.g., risk of electrical shock, chemical reactivity, falling hazard, or the like). Similarly, segment 230 is identified as a paragraph, segment 240 is identified as a "list" segment, and 250 is identified as a "diagram" segment. As previously noted, a system as disclosed herein may apply a variety of enrichments to properly identify a segment type, so that, for example, the segment 250 may be properly identified as a "diagram" despite containing a relatively high amount of text, for example using a machine learning model that has been trained to classify segment contents as "text" or "image". In some cases, such a determination may be made by the machine learning model or using a simpler classification algorithm that considers, for example, whether potential "text" in the segment contents float around diagram elements in a way that would be expected for document text. Each segment may have metadata attached as previously described with respect to FIGS. 1A-1B that identifies the type of segment.

Non-limiting examples of enrichments as disclosed herein are summarized in Table 1. More generally, any automatic processing technique may be applied as an enrichment to any associated type of segment to generate metadata for the segment.

TABLE 1

| Example enrichment processes | | |
| --- | --- | --- |
| Enrichment | Applicability | Purpose |
| Page Image Generator | Documents | Provide a set of individual page images (one image per page) that can be used as input for downstream tasks (like the Page Segmenter) |
| Page Segmenter | Full-page images | Breaks a page image into semantically-relevant sections and types like warnings, procedure steps, etc., each of which may be processed as one or more segments. |
| Flowchart | Flowchart segments with individual segments identified | Reconstruct flowchart graphs as data structures from a vision model output |
| Acronyms | Paragraphs and other text segments | Identify acronym definitions and/or expansions of acronyms if available; assign metadata with acronyms and expansions |
| External | any segment | Allows calling of external third-party APIs, for example to obtain additional metadata about the segment |
| NLP | Paragraphs and other text segments | Apply NLP models in formats compatible with popular NLP libraries like spacy, huggingface, etc. Models can be custom developed, custom third-party NLP models, and/or existing open source or commercially-available models. |
| List processing | Text segments | Breaks larger text segments into list items |
| Regex (regular expressions) | Any text | Allows users to specify regular expression patterns and extract/highlight them inside of documents and other segments |
| Segment Cropper | Any images | Provide a cropped image of an area within a specified region, such as a segment's bounding box. |
| TF-IDF | Any text | Compute and provide aggregate term frequency/ inverse document frequency (TF-IDF) statistics for identified text for statistical analysis |
| Vector Indexer | Any text or image segments | Index content using machine learning (ML)-based vectorization to allow semantically relevant nearest-neighbor search |

Other segment types may be identified by other enrichments, which may then generate associated metadata for the segment. For example, segment 220 is identified as a "warning" based on the content and combination of text and images, as well as the actual "WARNING" text present in In some embodiments, multiple enrichments may be applied to the same segment or segments. For example, the "flowchart" enrichment may be applied initially to recognize an entire page-sized flowchart layout as a single flowchart. The segment then may be routed to another flowchart enrichment that has been trained (in the case of a machine learning-based model or similar) or designed to decompose a flowchart into individual components, each of which may then be treated as a separate segment in addition to the page-level segment identified initially.

External enrichments may be used to take advantage of developments in other text processing, document processing, image processing, or other algorithms without the need to incorporate the updated algorithms directly into a system as disclosed herein. For example, some AI-based text processing and image recognition systems often provide public APIs to analyze text or images using their proprietary and/or public algorithms. Those algorithms may be updated relatively frequently. By using them as external enrichments, for example via the APIs they provide, systems as disclosed herein may take advantage of improvements to those algorithms without re-implementing them directly in the system. In some cases, however, external algorithms may be prohibited or restricted in use, such as where the system is used to analyze and/or generate data related to restricted-access documents such as classified documents, documents protected by non-disclosure agreements or the like, documents under a court-imposed protective order, and the like.

A first enrichment also may be applied to individual pages, for example to convert the page into a different format usable by other enrichments, to identify segments and segment types on the page, and/or otherwise prepare the page for further analysis by other enrichments. An example of such an initial processing enrichment is the Page Image Generator noted in Table 1, which generates an image of each page in the document for further processing. An initial processing enrichment such as this may be applied before one or more other enrichments that use the output as the basis for subsequent analysis. It may be applied consecutively or concurrently with other enrichments that do not use the initial processing output, such as where text preprocessors are used to generate segments for further text enrichment processing, while an initial page image generator enrichment is used to generate image data for subsequent vision- or image-based processing.

The specific enrichments applied to a particular segment may be determined automatically. For example, a trained machine learning system may be applied before other enrichments to identify the segment as a particular type (warning, paragraph, list, heading/title, image, etc.) based on previously-categorized segments used to train the machine learning system. For example, the "list" segment 230 may be identified as a list by a machine learning system that has been previously trained to distinguish between block text, unordered lists, instructions, and the like. Alternatively or in addition, in specific embodiments a user may indicate the desired enrichments to be applied to a document or a collection. This allows the enrichments and metadata to be customized for particular applications, without requiring the user to provide custom code for individual enrichments.

Continuing the "flowchart" enrichment example from above, it can be seen that segment-specific enrichments may be used to provide more fine-grained information and metadata than would be otherwise achievable, especially using conventional text- and document-processing techniques. As previously disclosed, a flowchart may be recognized within a document using a flowchart enrichment. The flowchart then may be decomposed into individual nodes using the same enrichment or a separate flowchart-deconstruction enrichment. Each node may represent a single step or decision in the flowchart, or it may represent a group of related items, such as a repeating loop, a conditional, or the like. Inside each action node of the flow chart, the enrichment may identify parts, actions (e.g., indicated by verbs), and references to other locations within the document (such as where the flowchart is part of a manual, e.g., "Refer to 'Fault Code Summary' at 310 in FIG. 3, discussed below). The treatment of text in these very specific contexts can be specified and the text processing is more likely to be accurate and successful than if those same treatments were applied across an entire document or document collection. This is because, at the level of the individual flowchart nodes, more accurate and safer assumptions may be made than could be made across the entire document or collection since there is a more limited range of text or action expected within a single flowchart.

After segments have been identified and/or generated and enrichments applied to the segments to generate associated metadata, the segments and their associated metadata may be used in a variety of ways. For example, technical information may be converted to different forms for use in other environments, such as augmented reality (AR) applications, virtual reality (VR) applications, and the like. Semantically-related material also may be identified and linked based on the metadata. For example, a technical manual for a product may be analyzed as disclosed herein to generate any number of segments and associated metadata. The segments may then be used to display the data in relevant segments in an AR system as a user views the physical components of the product, with the metadata used to identify relevant data from segments in the original manual for display in the AR system, for example in an overlay of the product component being viewed. Using links between the metadata of different components, the user may switch between different information in the AR system without the need to consult the original technical documentation. For example, if a component includes electrical connections, the AR overlay may include a link to electrical safety information that was identified in a separate segment, via metadata that indicates the safety information applies to electrical components of the product.

As another example, processes disclosed herein may be used to generate diagnostic aids from product manuals, technical data sheets, and the like. FIG. 3A shows an example of a technical data sheet that has been processed by a segmentation process as disclosed herein, with several different types of segments identified. Segments 301H have been identified as headings, segments 302P are identified as paragraphs, segments 303N are identified as "notes", which may be, for example, a particular type of "paragraph" text segment that has been identified to include semantically-important information, and segments 304L have been identified as "list" segments, which may be, for example, text segments that include bulleted text which may not be in full sentences and which may include more routine or conventional information than in the note segments 303N. Each segment may be identified as the segment type indicated by, for example, applying a page-level machine learning model to each page in the document. The machine learning model may have been previously trained on similar documents to allow for specific types of segments to be recognized efficiently, and/or it may have been trained on a wider range of documents to allow for more types of segments to be recognized. After the segments have been identified and associated metadata linked to each using one or more enrichments as previously disclosed, the segments may be used to generate the diagnostic aids 300 shown in FIG. 3B. Each diagnostic aid, shown with a dotted outline, is constructed from segments identified in FIG. 3A based on metadata attached to each segment, which indicates the semantic relationships between the segments. For example, the output from FIG. 3A may be used in conjunction with a rule that specifies all text from the top of a "heading" segment to the top of the next "heading" segment should be considered a semantic "section." Combined with an understanding of the two-column document layout, this allows sections to be aggregated into semantically-meaningful aids as shown in FIG. 3B.

Other segments identified in other pages within the document and/or other documents in the same collection also may be used to enhance the diagnostic aids based on similar or common metadata identified by the enrichments applied to those segments. FIG. 3C shows an example of a flowchart 310 that has been processed using one or more enrichments to identify metadata associated with the flowchart and with segments identified within the segment. Flowchart step 305 has been identified via associated metadata as relating to a diagnostic for a fuel pump, for example via an NLP enrichment, regular expression enrichment, or the like. This provides further context for the "fuel pump" diagnostic aid in the constructed diagnostic aids 300. Similarly, other components 315 of the flowchart may be used to link information from other segments in the document to other diagnostic aids 300 based on common or related metadata extracted for the associated segments in the flowchart.

A query language may be used to express geographic relationships along with metadata relationships. These relationships also may be used to define new segments that can be placed back into the system for use in later analysis, queries, and the like. The query language may use metadata associated with segments to find segments based on the queries. The metadata may include geographic, semantic, and or content-type information about segments as previously disclosed. Accordingly, a query used by embodiments disclosed herein may select segments based on geographic information as well as text-matching and other common query concepts. For example, embodiments disclosed herein may use queries such as "find all segments that lie between a heading that says 'diagnostic aid' and the top of the footer", or "all steps within this procedure," or "find all headings within this document" or the like.

A query language as disclosed herein may provide queries for objects and attributes using structured metadata; string-based, substring-based, and regular expression-based matches as well as arithmetic comparisons (less-than, greater-than, and the like); spatial queries based on the arrangement of elements in the document (such as "within", "above", "left-of", and the like); semantic queries based on vector representations of segments in embedding spaces by using nearest neighbors algorithms in the vector space of the embedding (headings like "oil change"); Boolean connectives such as AND, OR, and NOT, and the like, as well as subclauses joined to express complex constraints from any available query types together into complex expressions. For example, a complex query as disclosed herein may be to identify all segments within the top of the page that include troubleshooting information and images, excluding segments that relate to a battery charging system.

Table 2 provides examples to illustrate other types of queries that may be used by embodiments disclosed herein.

TABLE 2

| Query | Result | Comments |
|---|---|---|
| "2.4.2." in text | All segments having "2.4.2" as a substring of the text field of the segment | |
| "2.4.2." in text and segment_type = "procedure" | All segments with "2.4.2" in the segment text field, where the segment has a type "procedure" | The type of segment may have been previously determined using one or more enrichments as disclosed herein. |
| within ("2.4.2." in text and segment_type = "procedure") | Segments in the same physical extent ("within") of any segment of type "procedure" and having "2.4.2" in the text field. | Paragraphs, actions, diagrams, etc. also be constrained in a similar manner. |
| (segment_type = "actor" or segment_type = "action") and (within segment_type = "procedure-step" and (within (segment type = "procedure" and "2-4-2." in text))) | Any segments that are within a procedure-step within the regions of procedure 2.4.2 | Constraints as in the prior example may be performed within the context of a Boolean sub-clause. Filtered based on segment type. |
| perspective.name = "jobguide_steps" and (within segment_type = "procedure-step" and (within (segment_type = "procedure" and "2-4-2." in text))) | Results filtered based on on the attribute name of a perspective attribute of the segment. Subfields are accessed using the "." operator to separate fields from their parents | |
| perspective.name = "tech_manuals" and enrichment_data.confidence_score <= 0.6 | Any segments from a "tech_manuals" perspective that have 60% or lower confidence threshold | The confidence threshold may refer to a confidence score assigned to segment when it is assigned to the "tech_manuals" perspective (i.e., the set of segments believed to include technical manuals), for example based on an NLP or other enrichment analysis. |

11

Whether or not a segment-specific query language is used, embodiments disclosed herein may be used to respond to queries about the contents of a document collection in a more efficient and accurate manner than may be achieved using conventional document processing techniques, conventional search techniques, or human review of the document collection. Such a response may be generated by identifying segments that include content and/or metadata relevant to the query. The identified segments may be presented in their original form to a user, or they may be reconstituted into a more usable form, such as by presenting semantically-linked material as previously disclosed with respect to FIGS. 3A-3B. As another example, segments may be used to identify content relevant to another activity being performed by a user, such as where an AR system interfaces with a document segmentation system as disclosed herein, to obtain information about physical items being viewed by a user. The AR system may request information related to a device being viewed through the AR system, in response to which a system as disclosed herein may provide content from one or more segments that have metadata indicating that they contain information about that component or type of component.

In addition to the examples disclosed above, embodiments disclosed herein may be used to access, manipulate, and use documents, document collections, segments, perspectives, and other concepts disclosed herein to achieve other technical and use case improvements. In an embodiment, metadata attached to segments may be used in conjunction with other business processes. For example, users may have a collection of opportunity documents such as described in U.S. Pat. No. 10,810,240, the disclosure of which is incorporated by reference in its entirety. Using the segmentation, metadata, and perspective features disclosed herein, the document collection may be processed to extract contact information, relevant dates (such as submission dates, expiration dates, and the like), and technical subject matter. This data then may be compiled in a database of opportunities for more efficient searching, matching with respondents, and the like. It also may be used by a respondent that has applied to multiple opportunities such as grant programs to track status, re-use submission data, identify related opportunities, and the like.

In another embodiment, multiple teams or divisions within a larger enterprise may use perspectives as disclosed herein to collaborate among themselves. For example, Team A may have provided a perspective that segments a service manual into specific, discrete jobs. Such a perspective may allow users to run a query as disclosed herein to identify and list all steps within a particular job. Later, Team B determines that some job steps refer to other steps within other jobs by reference, such as where an automotive service manual may instruct a user "see Changing Oil" or the like. Team B can then extend and build on the work already done by Team A by defining a new perspective that links from the text "see Changing Oil" to the procedure for "changing oil" that was identified and segmented in Team A's original perspective.

The examples provided herein are intended to be illustrative. More generally, embodiments disclosed herein may provide methods for analyzing a corpus of documents that include receiving a plurality of documents and, for each document, performing a document segmentation procedure as disclosed herein. The document segmentation procedure may define a first plurality of segments in document, each of which may be defined by a rectangle or multipolygon around a physical region of the document; and may then apply one or more enrichments to generate metadata describing content within each segment and the position of the segment within a coordinate space defined over the plurality of documents. The enrichments may include, for example, natural language processing (NLP) analysis, a computer vision analysis, a text-matching analysis, or combinations thereof. In response to a request for information in the document, a second plurality of segments may be identified and selected, with each segment including metadata that indicates the segment is responsive to the request for information. A response may be generated to the request based on the second plurality of segments. The request may be received, for example, from an augmented reality (AR) system and the response includes content from the plurality of documents that relates to a physical item being viewed by a user through the AR system. The response may include one or more new documents generated from the second plurality of segments, which include content generated from content within the second plurality of segments. The document segmentation procedure may be performed for some, all, or any documents within a particular document collection.

A request for information from processed documents as disclosed herein may be provided in a query language that directly accesses documents segments. Such a language may include query commands that allow a user to specify features of segments returned in response to the query, for example, based on metadata associated with the second plurality of segments that are selected as being responsive to the request. That is, the language may allow a user to specify directly the content, type, or range of metadata and/or metadata values that should be included in the selected segments and thus in the response. The metadata may include the physical positions of the segments on the page and/or in the overall coordinate system of the document collection. The metadata also may describe a type of content of each segment in the first plurality of segments. The metadata may be used to assign document segments to a "perspective" as defined herein, which indicates a semantic relationship between segments in the perspective. The perspective may be defined based on information received from a user, or it may be determined algorithmically, for example using clustering algorithms or other machine learning algorithms.

Example features and implementations of the embodiments disclosed herein are provided for illustration purposes and are not intended to be limiting of the claims and concepts presented herein. It will be understood that other variations and arrangements may be used without departing from the scope and content of the present disclosure.

The invention claimed is:

1. A computer-implemented method of analyzing a corpus of documents, the method comprising, by a computer processor:

receiving a plurality of documents;

for a first document of the plurality of documents, assigning a unique coordinate to the first document in a coordinate space defined over the plurality of documents and performing a document segmentation procedure comprising:

defining a first plurality of segments in the first document, each segment of the plurality of segments being defined by a multipolygon around a physical region of the document; and for each segment of the first plurality of segments, applying one or more enrichments to generate metadata describing content within the each segment; and for each segment of the first plurality of segments, assigning coordinates of the each segment in the coordinate space defined over the plurality of documents;

receiving a request for information contained in the plurality of documents;

selecting a second plurality of segments from among all segments defined in the plurality of documents, wherein each segment in the second plurality of segments includes metadata that indicates the segment is responsive to the request for information;

generating a response to the request, the response including content contained in the second plurality of segments;

receiving a second plurality of documents;

assigning a coordinate in the coordinate system to each document in the second plurality of documents;

based on the coordinates assigned to the second plurality of documents and coordinates assigned to the first plurality of documents, determining that an enrichment applied to the first plurality of documents has not been applied to the second plurality of documents; and responsive to the determining that the enrichment has not been applied to the second plurality of documents, applying the enrichment to the second plurality of documents.

2. The method of claim 1, wherein the request is received from an augmented reality (AR) system and the response includes content from the plurality of documents that relates to a physical item being viewed by a user through the AR system.

3. The method of claim 1, wherein the response to the request comprises a new document generated from the second plurality of segments and including content generated from content within the second plurality of segments.

4. The method of claim 1, further comprising:

performing the document segmentation procedure for at least a second document of the plurality of documents.

5. The method of claim 4, comprising:

performing the document segmentation procedure for all documents in the plurality of documents.

6. The method of claim 1, wherein the request for information is formulated in a query language that directly accesses the first plurality of segments and includes query commands allowing a user to specify features of the second plurality of segments based on metadata of the second plurality of segments.

7. The method of claim 1, wherein the metadata describes the physical positions of the first plurality of segments.

8. The method of claim 7, wherein the metadata describes a type of content of each segment in the first plurality of segments.

9. The method of claim 1, further comprising:

based on the metadata, assigning one or more of the first plurality of segments to a perspective, the perspective indicating a semantic relationship between segments in the perspective.

10. The method of claim 9, wherein the perspective is based on a perspective definition received from a user.

11. The method of claim 1, wherein the one or more enrichments include a natural language processing (NLP) analysis, a computer vision analysis, a text-matching analysis, or a combination thereof.

12. The method of claim 1, wherein each multipolygon around each segment in the first plurality of segments is defined within the coordinate system.

13. The method of claim 1, further comprising:

receiving a subsequent request for information contained in the first plurality of documents, the second plurality of documents, or a combination thereof;

selecting a third plurality of segments from among all segments defined in the first plurality of documents and/or the second plurality of documents, wherein each segment in the third plurality of segments includes metadata that indicates the segment is responsive to the subsequent request for information; and generating a response to the subsequent request, the response including content contained in the third plurality of segments.

14. A system comprising:

a computer-readable document data store storing a plurality of documents; and a computer processor configured to:

for a first document of the plurality of documents, assign a unique coordinate to the first document in a coordinate space defined over the plurality of documents and perform a document segmentation procedure comprising:

defining a first plurality of segments in the first document, each segment of the plurality of segments being defined by a multipolygon around a physical region of the document; and for each segment of the first plurality of segments, applying one or more enrichments to generate metadata describing content within the each segment; and for each segment of the first plurality of segments, assigning coordinates of the each segment in the coordinate space defined over the plurality of documents;

receive a request for information contained in the plurality of documents;

select a second plurality of segments from among all segments defined in the plurality of documents, wherein each segment in the second plurality of segments includes metadata that indicates the segment is responsive to the request for information;

generate a response to the request, the response including content contained in the second plurality of segments receive a second plurality of documents;

assign a coordinate in the coordinate system to each document in the second plurality of documents;

based on the coordinates assigned to the second plurality of documents and coordinates assigned to the first plurality of documents, determine that an enrichment applied to the first plurality of documents has not been applied to the second plurality of documents; and responsive to the determining that the enrichment has not been applied to the second plurality of documents, apply the enrichment to the second plurality of documents.

15. The system of claim 14, wherein the processor is further configured to store the metadata in the computer-readable document data store in a data structure that links the metadata, the first plurality of segments, and the first document.

16. The system of claim 14, the computer processor further configured to:

receive a subsequent request for information contained in the first plurality of documents, the second plurality of documents, or a combination thereof;

select a third plurality of segments from among all segments defined in the first plurality of documents and/or the second plurality of documents, wherein each segment in the third plurality of segments includes metadata that indicates the segment is responsive to the subsequent request for information; and generate a response to the subsequent request, the response including content contained in the third plurality of segments.

* * * * *